United States Patent [19]

Mertes

[11] 4,236,773
[45] Dec. 2, 1980

[54] LOW FRICTION DRAWER SUPPORT

[76] Inventor: Paul M. Mertes, 15528 Don Metz St., Mission Hills, Calif. 91344

[21] Appl. No.: 11,177

[22] Filed: Feb. 12, 1979

[51] Int. Cl.³ .................... F16C 29/02; F16C 21/00
[52] U.S. Cl. .............................. 312/341 R; 308/3.6; 308/3.8; 312/350
[58] Field of Search ............ 312/135, 202, 339–341 R, 312/350; 308/3.6, 3.8

[56] References Cited

U.S. PATENT DOCUMENTS

| | | | |
|---|---|---|---|
| 1,970,439 | 8/1934 | Townsend | 312/341 R |
| 3,095,250 | 6/1963 | Frederick | 312/341 R |
| 3,099,501 | 7/1963 | Hillson et al. | 312/341 R |
| 3,112,960 | 12/1963 | Hillson et al. | 308/3.8 |
| 4,070,076 | 1/1978 | Zwillinger | 312/341 R |

*Primary Examiner*—Casmir A. Nunberg
*Attorney, Agent, or Firm*—Poms, Smith, Lande & Rose

[57] ABSTRACT

A cabinet drawer is provided with two drawer supports or rollers which are mounted near the front edge of the cabinet which supports the drawer, and below the edges of the drawer. The roller or support assembly includes a roller which is relatively flat and is mounted to rotate about an axis which is tilted inward toward the drawer by about 12 degrees. The upper surface of the roller is a relatively flat cone, and the roller rotates with the drawer in engagement with the horizontally extending outer portion of the upper conical surface of the roller. The support makes engagement with the lower surface of the flat roller, and is also provided with tabs for securing the roller assembly to the cabinet. The roller and its housing or support are held together by an axial member which may be a part of the roller, a part of the support, or a separate securing fastener. The roller and its housing should be of material having good wear qualities and low relative friction; for example, the roller may be of acetal resin, and the housing may be of high density polyethylene. Ball bearings may be provided between the roller and the housing; and the roller may be held in position by several retaining elements.

15 Claims, 14 Drawing Figures

LOW FRICTION DRAWER SUPPORT

FIELD OF THE INVENTION

The present invention relates to low friction drawer supports.

BACKGROUND OF THE INVENTION

Many cabinets in use today do not employ rollers to support the drawers because of the size of the normal roller assemblies, the mechanical problems associated with them, and the costs of drawer rollers. Where rollers are employed in cabinets, the rollers normally have a metal holder or housing, and a steel shaft on which a plastic roller is mounted. With the weight of the drawer pressing downwardly on the roller, which is supported in a cantilevered manner on the metal shaft, the movement of the drawer back and forth stresses the fasteners which secure the housing to the cabinet, and these screws or staples sometimes work loose. It is also noted that the use of rollers of the type currently employed increase the complexity of cabinet design. More specifically, since the rollers and their associated housings are below the top surface of the rail of the cabinet face frame, in many mechanical configurations, cutouts must be made in the cabinet construction to accommodate the rollers, before they are mounted in place.

In modern construction, staples are usually employed in the assembly of the various parts. In the assembly of prior art type rollers, with their metal housings, very accurate orientation of staple guns relative to the openings in the metal housings are required; otherwise, the staples will merely bend over, and the housing will not be fully secured into the cabinet.

It is also noted that the cantilevered type of plastic rollers have a tendency to flatten out under heavy static loads, allowing the drawer side to scrape the roller housing and the screws or the staples holding the housing in place. Furthermore, conventional plastic rollers with steel housings of the type described above tend to be somewhat noisy, in addition to the other disadvantages set forth above.

A principle object of the present invention is to provide a low-cost and low friction drawer roller assembly which avoids all of the problems of conventional drawer rollers as outlined above.

SUMMARY OF THE INVENTION

In one specific illustrative preferred embodiment of the invention, the drawer roller assembly is of very limited vertical extent and has high load bearing capability. These results are achieved through the use of a somewhat mushroom shaped "roller" or rotatable bearing which has its axis tilted only slightly from the vertical, with the load bearing surface being a relatively flat cone, corresponding to the top of the mushroom. The roller housing or body has a seat for the roller, and this seat is tilted from the horizontal by the same small angle that the axis of the cone is tilted from the vertical, so that the lower edges of the drawer are supported on the roller along a horizontal line which is a tangent to the upper conical bearing surface of the roller; and as the drawer is opened and closed, the roller rotates, with the drawer edge engaging successive portions of the upper surface of the cone. In this embodiment the mushroom shaped roller has a stem which passes through a corresponding opening in the stationary housing or body and holds the roller in its proper assembled position.

In accordance with another embodiment of the invention the roller and its fixed supporting housing or body may be held together by an extension from the body, rather than from the roller; alternatively, a separate fastener or suitable retaining fingers, may be employed. Additionally, if desired for high load applications, ball bearings may be employed to support the rotatable drawer engaging element.

Another feature of the invention involves the provision of securing tabs or locations which are recessed so that the sides and bottom of the drawer cannot engage the staples or screws which secure the drawer support in place.

Concerning materials, any suitable low friction combination of structural materials may be employed. One particularly suitable set of materials employed a roller of acetal metal resin and an associated body of high density polyethylene.

Concerning the tilt of the axis of the conical roller, it should be between about 5 degrees and 30 degrees, preferably between 10 degrees and 15 degrees, with 12 degrees having been successfully employed. When a 12 degree tilt angle is employed, a tangent to the cone makes an angle of 78 degrees with the axis of the cone; and the seat in the roller housing is oriented at 12 degrees with the horizontal, so that the portion of the conical roller surface which engages the drawer is horizontal.

As a collateral feature of the invention, the member which secures the roller to its housing may be resilient, by cutting a slot in its shaft, for example, so that the roller may be easily snapped into place in the housing.

Two important advantages of the invention which both arise from the unique shape of the roller assembly include the minimum vertical space occupied by the roller, and the high strength and resistance to deformation under high static loads resulting from the full compressive load support of the roller by its housing.

Other advantages of the invention include its low cost, and the complete absence of the squeaking and scraping which is frequently associated with prior types of roller assemblies. Also, there is no need to make special cutouts to receive the roller assemblies, as they are less than one-quarter of an inch in height. Further, with the roller housing being made of plastic, it is fully compatible with the use of staple guns to assemble to the cabinet without the need for careful alignment of the staple gun with the plastic housing prior to securing the unit in place.

Other objects, features, and advantages of the present invention will become apparent from a consideration of the following detailed description, and from the accompanying drawings.

DETAILED DESCRIPTION

Figure 1:
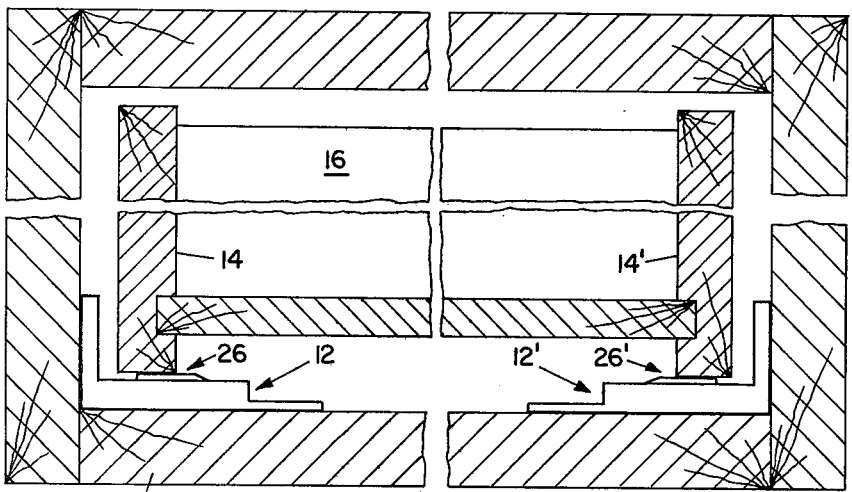
FIG. 1 is a schematic showing of a drawer mounted in a cabinet using a pair of low friction roller assemblies illustrating the principles of the present invention.

Referring more particularly to the drawings, the present invention relates to a new form of a drawer roller assembly, as shown at 12 and 12' in FIG. 1 of the drawings, supporting the outer sides 14 and 14' of a drawer 16. The roller assemblies 12 and 12' are supported within the cabinet 18 on the horizontal support member 20, or on side rails within the cabinet. The roller assemblies 12 and 12' are normally located immediately adjacent the front opening of the cabinet 18 which receives the drawer 16.

Figure 2:
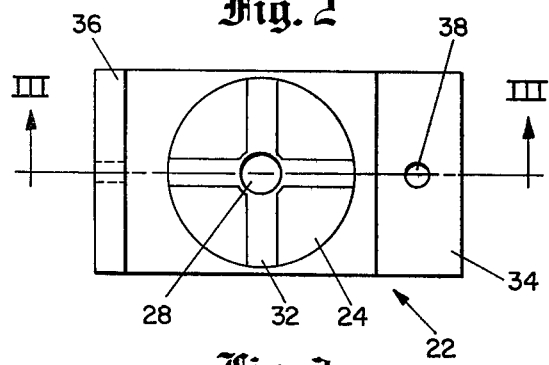
FIG. 2 is a top view of the roller housing employed in a preferred embodiment of the invention.
Figure 3:
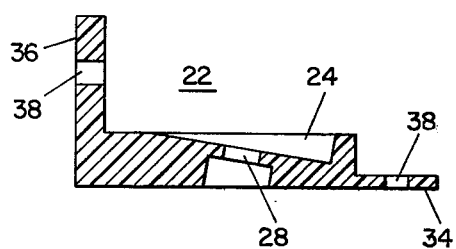
FIG. 3 is a cross sectional view taken along lines III—III of FIG. 2.
Figure 4:
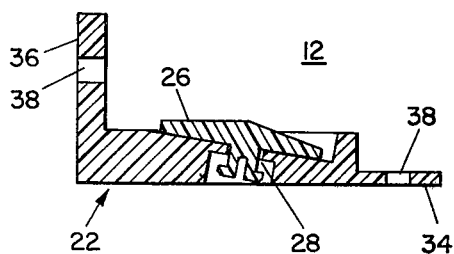
FIG. 4 is a cross sectional view corresponding to that of FIG. 3, but with the roller in place.

The details of the drawer roller assemblies are shown in FIGS. 2 through 5 of the drawings in which FIG. 4 is an assembly drawing, and FIGS. 2 and 3 show the housing. The roller element per se is shown in a top view in FIG. 5. Now, referring to FIGS. 2 and 3, the roller support assembly 22 includes a recess 24 for receiving the roller element per se, designated 26 in FIGS. 4 and 5, and a central opening 28. The central opening 28 is countersunk at its lower end to a larger diameter to receive a protrusion 30 which may form part of the roller 26, and serves to hold the roller 26 in place within the housing 22. The recess 24 may have raised area 32 of a cross configuration and certain relieved areas for easier rotation of the lower surface of the roller 26 which is supported by and which bears upon the upper surface of the recess 24.

The support assembly 22 also includes the two tabs 34 and 36 which permit easy securing of the roller assembly 12 in position within the cabinet 18. The assemblies 12 may be secured in place by screws passing through the openings 38 in the securing tabs, or by the application of staples through the tabs 34 and 36.

Figure 5:
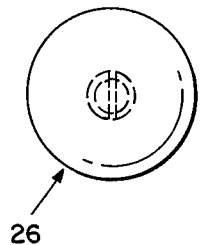
FIGS. 5 and 6 are top and side views, respectively, of the roller employed in the assembly of FIG. 4.
Figure 6:
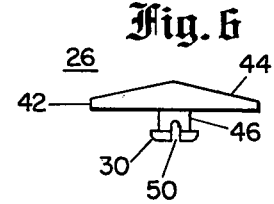

Now, referring to the roller per se, and with reference to FIGS. 4, 5 and 6, it includes a head portion 42 having an upper conical surface 44, a stem 46, and a lower enlarged portion 48 for holding it within the aperture 28. In addition, the stem 46 and the associated enlarged portion 48 may contain a slot 50 to provide increased resilience to aid in assembly of the unit through the opening 28. With selected materials having suitable resilience, the slot 50 may be dispensed with.

Figure 7:
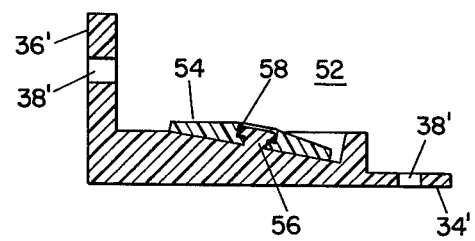
FIG. 7 is a cross-sectional view similar to that of FIG. 4, of an alternative embodiment of the invention.
Figure 8:
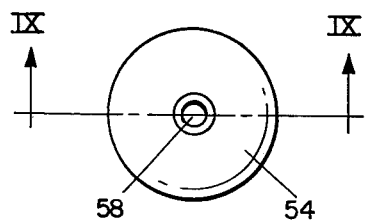
FIGS. 8 and 9 are top and side views, respectively, of the roller shown in the assembly of FIG. 7.

The assembly 52, as shown in FIG. 7, is similar in construction to the assembly 12, as shown in FIG. 4, and corresponding parts will carry corresponding numerals, but with primed references for FIG. 7 to distinguish them from the reference numerals of FIG. 4. In FIG. 7 the roller 54 is of substantially the same configuration as to its upper conical surface and its lower flat surface as the member 26 shown in prior figures of the drawing. However, instead of the stem 46 which interfits with a countersunk hole 28 in the earlier embodiments of the drawing, the arrangement of FIG. 7 includes a stem 56 with an associated protuberance which passes through the countersunk opening 58 in the roller 54. Top and cross-sectional views of the roller 54 are set forth in FIGS. 8 and 9, respectively, with FIG. 9 being taken along the plane indicated by lines IX—IX of FIG. 8. As in the case of the stem 46 and protuberance 48 of the roller 26, the central stem 56 forming part of the housing, as shown in FIG. 7, may be tapered at its upper end and provided with a slot to facilitate assembly.

Figure 9:
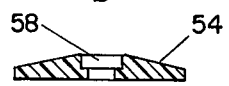

With reference to the assembly drawings of FIGS. 1, 4, and 7, it may be noted that the angle of inclination of the seat for the roller is equal to the complement of the angle of the cone with respect to the axis of the rollers 26 and 54, so that the portion of the roller which engages the lower edges of the drawer is always oriented horizontally. More specifically, with the seat of the housing being oriented at approximately 12 degrees with respect to the horizontal, the angle between the cone and the axis of the roller, as shown in FIGS. 6 and 9, is equal to 78 degrees, with 78 degrees being the complement of 12 degrees, of course. Accordingly, the drawer 14 engages a horizontally extending portion of the conical surface of the roller 26, as shown in FIG. 1.

Figure 10:
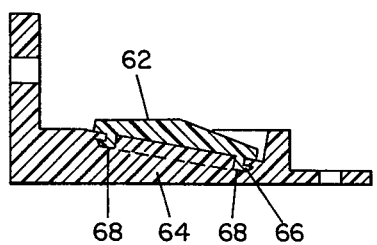
FIG. 10 is a cross-sectional view of another embodiment of the invention.
Figure 11:
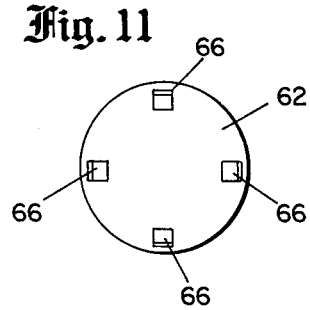
FIGS. 11 and 12 are bottom and side views, respectively, of the roller employed in the assembly of FIG. 10.
Figure 12:
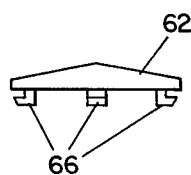

FIG. 10 of the drawings shows still another embodiment of the invention in which alternative arrangements are employed for securing the roller 62 to the housing 64. More particularly, and as shown in the bottom view of the roller 62, as represented by FIG. 11, the feet 66 have overhanging toes which extend downwardly into an undercut groove 68 in the housing 64 so that, when the roller 62 is pressed into position, it is firmly secured in place against accidental jarring loose. The side view of FIG. 12 shows the configuration of the feet 66 to advantage.

Figure 13:
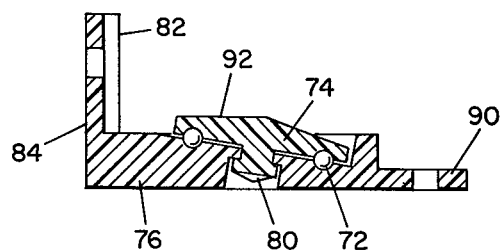
FIG. 13 is a transverse cross-sectional view of still another embodiment.
Figure 14:
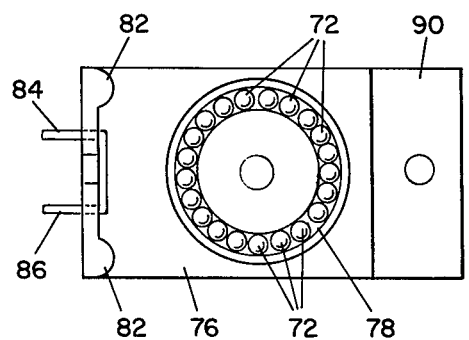
FIG. 14 is a top view of the unit of FIG. 12 with the drawer engaging roller element removed.

FIGS. 13 and 14 show still another embodiment of the invention, with this embodiment employing ball bearings 72 to facilitate the rotation of the roller 74 with respect to the housing 76. Concerning FIG. 14, this view shows the unit with the roller 74 removed, and the ball bearings 72 mounted in the circular groove 78 in the housing 76. As in the case of the arrangement of FIG. 4, for example, the roller 74 is held in position by the stem 80 which may be forced through the opening in the housing 76. The roller 74 is formed with a matching groove in its lower surface, and once it is snapped into position, the ball bearings 72 are held between the roller 74 and the housing 76 in the matching circular grooves in these two parts. Also shown in FIGS. 13 and 14 are the ridges 82 on the vertically extending portion 84 of the housing 76. As best seen in FIG. 14, a staple 86 may be employed to secure the vertically extending portion 84 to the inner sidewall of a cabinet, and the rounded protuberances 82 will prevent the engagement of the drawer 14 with the staple 86, thereby providing a low friction side engagement for the drawer to facilitate its opening and closing even when lateral pressure is applied to the drawer.

In a similar manner, the horizontal securing tab 90 has its upper surface substantially below the plane 92 where the drawer would engage one surface of the roller 74. Accordingly, whether staples or screws are employed to hold the housing 76 in place within the cabinet, the disclosed structure assures free sliding of the drawers without frictional engagement against the fasteners.

Incidentally, concerning the dimensions of the roller assembly, it is less than one-quarter of an inch in height, so that it may easily be applied to the supporting rails or frame members within the cabinet 18 without the necessity for provision of additional cutouts, such as are required for conventional rollers. In addition, the diameter of the roller is approximately three-quarters of an inch. The mounting flanges 34 and 36 may be in the order of one-sixteenth of an inch in thickness. Incidentally, with regard to the angle of the seat and the corresponding angle of the cone, an angle of approximately 12 degrees is preferred, with a range of between about 5 degrees and 30 degrees being acceptable, and between 10 and 15 degrees being advantageously employed. Any suitable low friction materials may be employed to implement the present invention; however, particularly advantageous results have been obtained, from the standpoints of cost, strength, and low friction, using a roller of acetal resin and a matching body member of high density polyethylene.

It is to be understood that the foregoing specific description is illustrative of the preferred embodiment of the invention. Other arrangements are considered to be within the scope of the present invention, and this would include using a separate fastener to secure the roller to its housing, using securing tabs extending laterally from the side of the unit, instead of from its ends, and using different plastic, or plastic and metal materials for the two elements of the assembly. In addition, the lower surface of the roller and its mating seat could be slightly conical, instead of flat, if desired. Also, instead of the roller being retained in place in the support by a central integral or separate fastener, or be feet as shown in FIGS. 10-12, the roller could be provided with a peripheral groove which may be engaged by one or more resilient retaining fingers. For higher load applications, the tolerance between the periphery of the roller and the mating recess in the support could be substantially reduced, so that, under peak load conditions, the roller periphery would engage the side wall of the recess, thereby receiving additional support. It may also be noted that the stem on the fastener structure such as 46 or 56, for example, which retains the roller and support assembled, may be chamfered to facilitate assembly, and may have a suitable length to permit easy disassembly (see FIG. 4) or to minimize vertical distance (see FIG. 7) required for the roller. Accordingly, the present invention is not to be limited by the exact form shown and described in detail hereinabove.

What is claimed is:

1. A high strength drawer support and low friction slide and roller comprising:
    a roller member in the form of a disk, the upper surface of said disk having a relatively flat conical bearing surface, said bearing surface making an angle of more than 60 degrees and less than 85 degrees with the axis of said disk, said bearing surface extending for the greater portion of the distance from the axis of said disk to the rim of said disk;
    a housing structure for said roller member, said housing structure including means for supporting said roller member with its axis tilted with respect to the vertical and the bearing surface substantially horizontal, and said housing structure making surface-to-surface engagement with the lower side of said disk at substantial supporting areas spaced around the axis of said disk;
    said housing structure including means for securing to a cabinet or other furniture with the bearing surface of said roller member oriented substantially horizontally to engage the lower outer edge of a drawer; and
    means for securing said roller member in said housing structure.

2. A high strength, low friction drawer roller assembly as defined in claim 1, wherein said means for securing said roller member in said housing structure includes a stem secured to one of said two elements including the roller member and the housing and extending through an aperture in the other.

3. A high strength, low friction drawer roller assembly as defined in claim 2, wherein said stem is secured to said roller member.

4. A high strength, low friction drawer roller assembly defined in claim 2, wherein said stem is secured to said housing.

5. A high strength, low friction drawer roller assembly as defined in claim 1 wherein said roller member is formed of acetal resin and said housing is made of high density polyethylene.

6. A high strength, low friction drawer roller assembly as defined in claim 2 wherein said stem is slotted for ease in assembly of said roller and said housing.

7. An assembly including two drawer support and roller assemblies as defined in claim 1 and further comprising:
    means for fixedly mounting said two drawer support and roller assemblies in a cabinet on either side of a drawer opening; and
    a drawer having lower outer edges spaced apart by a distance equal to the spacing of said roller members, mounted in said cabinet and supported directly on the bearing surfaces on said roller members.

8. An assembly as defined in claim 7 further comprising drawer side rails in said cabinet on either side of said drawer opening, and means for mounting said support and roller assemblies on said drawer side rails.

9. A drawer support as defined in claim 1 wherein said securing means includes recessed surface means for receiving a fastener whereby the plane of the surfaces of the drawer which engage said drawer support are spaced from the fasteners to avoid frictional contact between the drawer and the fasteners.

10. A drawer support assembly as defined in claim 1 further comprising ball bearinhg means mounted between said roller member and said housing.

11. A drawer support and low friction slide comprising:
    an L-shaped housing including a generally horizontally extending base and a vertically extending mounting flange, said base being provided with an opening extending through the base, the opening having a central a axis making a predetermined acute angle less than 20 degrees with the vertical, said opening having a slightly enlarged countersunk hole extending from the bottom of said base, and a larger countersunk opening extending to or close to the upper surface of said base toward said mounting flange; and
    a mushroom shaped roller mounted in said opening to rotate about the axis of said opening, the top of said roller being a relatively flat cone, whereby the surface of said flat cone is substantially parallel to the horizontal above the surface of said base toward the mounting flange, and is angled below the upper surface of said base in the direction away from said flange.

12. A high strength drawer support and low friction slide and roller comprising:
- a roller having a relatively flat conical bearing surface, said bearing surface making an angle of more than 60 degrees and less than 85 degrees with the axis of said roller;
- a housing structure for said roller, said housing structure including means for supporting said roller with its axis tilted with respect to the vertical and the bearing surface substantially horizontal;
- said housing structure including means for securing to a cabinet or other furniture with the bearing surface of said roller oriented substantially horizontally to engage the lower outer edge of a drawer;
- means for securing said roller in said housing structure; and
- said bearing surface angle being more than 75 degrees and less than 80 degrees.

13. A high strength drawer support and low friction slide end roller comprising:
- a roller having a relatively flat conical bearing surface, said bearing surface making an angle of more than 60 degrees and less than 85 degrees with the axis of said roller;
- a housing structure for said roller, said housing structure including means for supporting said roller with its axis tilted with respect to the vertical and the bearing surface substantially horizontal;
- said housing structure including means for securing to a cabinet or other furniture with the bearing surface of said roller oriented substantially horizontally to engage the lower outer edge of a drawer; and
- means for retaining and securing said roller in said housing structure, said retaining and securing means including a retaining groove on one of said roller or housing structure, and a plurality of structural means extending from the other of said roller or housing into said retaining groove to hold the two parts together.

14. A drawer support and low friction slide and roller as defined in claim 1 wherein the vertical distance from the lowest point of said support to said bearing surface is less than the radius of said disk.

15. A drawer support and low friction slide as defined in claim 11 wherein said roller is provided with enlarged stem means for positively retaining said roller in said opening.

* * * * *